US008413779B2

(12) United States Patent
Fronius et al.

(10) Patent No.: US 8,413,779 B2
(45) Date of Patent: Apr. 9, 2013

(54) DUAL CLUTCH ARRANGEMENT

(75) Inventors: Kuno Fronius, Lauffen (DE); Jan Hasenkamp, Flein (DE); Salvatore Gaggia, Stuttgart-Feuerbach (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 792 days.

(21) Appl. No.: 12/360,045

(22) Filed: Jan. 26, 2009

(65) Prior Publication Data

US 2009/0194383 A1 Aug. 6, 2009

(30) Foreign Application Priority Data

Feb. 1, 2008 (DE) .................. 10 2008 008 062

(51) Int. Cl.
*F16D 21/06* (2006.01)
(52) U.S. Cl. ................... 192/48.8; 192/30 V; 192/110 B
(58) Field of Classification Search ................ 192/48.2, 192/48.619, 48.8, 48.9, 48.91; 74/330
See application file for complete search history.

(56) References Cited

U.S. PATENT DOCUMENTS

| | | | | |
|---|---|---|---|---|
| 3,747,436 A * | 7/1973 | Hause | ............................. | 475/69 |
| 6,481,149 B1 * | 11/2002 | Hall et al. | .................... | 43/43.16 |
| 6,491,149 B1 * | 12/2002 | Kundermann et al. | ...... | 192/48.9 |
| 7,147,095 B2 * | 12/2006 | Kraxner et al. | .......... | 192/48.618 |
| 7,322,455 B2 * | 1/2008 | Vetter et al. | ................... | 192/48.9 |
| 7,392,890 B2 * | 7/2008 | Agner | ........................... | 192/48.8 |
| 7,445,108 B2 * | 11/2008 | Bauer et al. | .............. | 192/48.619 |
| 7,484,607 B2 * | 2/2009 | Schneider et al. | ......... | 192/55.61 |
| 7,497,312 B2 * | 3/2009 | Braford, Jr. | .............. | 192/48.603 |
| 7,743,898 B2 * | 6/2010 | Gerlach | .................... | 192/48.619 |
| 2005/0067251 A1 * | 3/2005 | Braford et al. | ............. | 192/70.12 |
| 2006/0000684 A1 * | 1/2006 | Agner et al. | .................. | 192/48.8 |
| 2007/0175726 A1 * | 8/2007 | Combes et al. | ............ | 192/87.11 |
| 2007/0256907 A1 * | 11/2007 | Gremplini et al. | ......... | 192/87.11 |
| 2008/0271968 A1 * | 11/2008 | Metzinger et al. | ........... | 192/48.8 |
| 2008/0283330 A1 * | 11/2008 | Ebner et al. | ................... | 180/381 |

FOREIGN PATENT DOCUMENTS

| | | |
|---|---|---|
| CN | 1637310 A | 7/2005 |
| DE | 10 2004 061 020 A1 | 7/2005 |
| DE | 10 2006 010 707 A1 | 9/2007 |
| DE | 01 2006 014562 A1 | 10/2007 |
| DE | 10 2006 014 562 A1 | 10/2007 |
| DE | 102006014562 | 10/2007 |
| EP | 1 610 021 A1 | 1/2005 |
| EP | 1 813 832 | 8/2007 |
| EP | 1 818 557 | 8/2007 |
| WO | WO 03/006840 | 1/2003 |
| WO | WO 2007/051627 | 5/2007 |
| WO | WO 2007/051627 A1 | 5/2007 |

* cited by examiner

*Primary Examiner* — Ha D Ho
*Assistant Examiner* — Jude Agendia
(74) *Attorney, Agent, or Firm* — Knobbe, Martens, Olson & Bear, LLP (57) ABSTRACT

A dual clutch arrangement for a dual clutch transmission for motor vehicles has a first and a second friction clutch. The friction clutches have a common input member and in each case one output member. The output member of the first friction clutch is connected to a first shaft. The output member of the second friction clutch is connected to a second shaft which is formed as a hollow shaft concentrically around the first shaft. The first and the second friction clutches are nested radially one inside the other. The input member is mounted radially on the second shaft.

24 Claims, 5 Drawing Sheets

DUAL CLUTCH ARRANGEMENT

CROSS-REFERENCE TO RELATED APPLICATIONS

This application claims the priority of German patent application DE 10 2008 008 062 filed Feb. 1, 2008.

BACKGROUND OF THE INVENTION

The present invention relates to a dual clutch arrangement for a dual clutch transmission for motor vehicles, having a first and a second friction clutch, which friction clutches have a common input member and in each case one output member, with the output member of the first friction clutch being connected to a first shaft and with the output member of the second friction clutch being connected to a second shaft which is formed as a hollow shaft concentrically around the first shaft, with the first and the second friction clutches being nested radially one inside the other. A dual clutch arrangement of said type is known from document DE 10 2004 061 020 A1, with a vibration damper arrangement for damping undesired vibrations being arranged radially outside the friction clutches.

Dual clutch transmissions are generally known. They contain a dual clutch arrangement having two friction clutches and a multi-step transmission having two parallel partial transmissions. A branch having a first friction clutch and a first partial transmission is assigned the odd-numbered gear stages. The other branch having the second friction clutch and the second partial transmission is assigned the even-numbered gear stages. At the input side, the friction clutches are connected to a drive engine, for example an internal combustion engine, a hybrid drive unit or the like. The partial transmissions are generally realized as spur gear transmissions. The connection of the friction clutch arrangement to the partial transmissions takes place by means of a shaft arrangement having an inner shaft and having a hollow shaft which is arranged concentrically with respect to said inner shaft.

It is possible, by means of overlapping actuation of the two friction clutches, to carry out gearshifts without an interruption in tractive force. The actuation of the friction clutches takes place in an automated fashion. The actuators used for this purpose may be hydraulic or electric actuators.

In the dual clutch arrangement which is known from the above-cited document DE 10 2004 061 020 A1, the input member of the friction clutches is mounted on the housing and thereby encloses a chamber via which cooling and lubricating oil is discharged. The friction clutches are embodied as wet-running multiplate clutches. The vibration damper arrangement is arranged radially outside the friction clutches and is likewise of wet-running design.

Similar dual clutch arrangements are also known from documents DE 10 2006 010 707 A1 and EP 1 610 020 A1, with no vibration damper arrangement being provided in the first of said documents, and with a vibration damper arrangement being arranged outside the clutch housing, and therefore so as to be dry-running, in the second document.

Furthermore, document DE 2006 014 562 A1 discloses a dual clutch arrangement in which the friction clutches are nested radially one inside the other and a vibration damper arrangement is arranged in the axial direction in front of the friction clutches. A common input member of the two friction clutches is mounted on the second shaft, with a shaft section of the input member extending rearward in the axial direction. The dual clutch arrangement known from document DE 10 2006 014 562 A1 is of very large overall construction in the axial direction. This is also on account of the fact that the input member of the friction clutches is connected to a so-called secondary part which extends forward around the vibration damper arrangement in the axial direction in order to be able to additionally mount the friction clutches on a front housing part.

For the installation of such dual clutch arrangements in drivetrains of front-transverse layout, an axially compact design is of great importance.

BRIEF SUMMARY OF THE INVENTION

It is accordingly the object of the invention to provide an improved dual clutch arrangement, which is in particular of axially short construction, for a dual clutch transmission.

Said object is achieved by a dual clutch arrangement for a dual clutch transmission for motor vehicles, having a first and a second friction clutch, which friction clutches have a common input member and in each case one output member, with the output member of the first friction clutch being connected to a first shaft and with the output member of the second friction clutch being connected to a second shaft which is formed as a hollow shaft concentrically around the first shaft, with the first and the second friction clutches being nested radially one inside the other, wherein the input member is mounted radially on the second shaft.

The dual clutch arrangement according to the invention can be of axially very short construction. Firstly, the two friction clutches are nested radially one inside the other, that is to say are not arranged axially adjacent to one another. Secondly, the input member is mounted radially on the second shaft. This also permits an axially compact design.

The object is thereby achieved in its entirety.

It is particularly advantageous if a vibration damper arrangement for damping undesired vibrations is arranged radially outside the friction clutches.

Here, the vibration damper arrangement is provided within a housing of the dual clutch arrangement, such that it is not necessary for a further vibration damper arrangement (such as for example a dual-mass flywheel) to be provided outside the housing.

As a result of the arrangement radially outside the friction clutches, it is possible to realize at least a certain degree of overlap with the friction clutches in the axial direction, thereby promoting an axially short design.

It is particularly advantageous if the vibration damper arrangement is aligned axially with the friction clutches.

In said embodiment, the vibration damper arrangement is arranged in the axial direction so as to completely or substantially overlap the friction clutches, thereby resulting in a short axial design.

According to an alternative embodiment, a vibration damper arrangement for damping undesired vibrations is arranged laterally adjacent to the friction clutches.

It is possible to obtain a radially compact design in this way. Furthermore, it is possible for the flow through the first friction clutch to be improved.

According to a further alternative embodiment, a vibration damper arrangement is provided outside a housing of the dual clutch arrangement.

Here, the vibration damper arrangement may be embodied for example as a dual-mass flywheel. Said embodiment is preferable if there are considerable installation space restrictions in the region of the dual clutch.

According to a further preferred embodiment, a bearing arrangement for mounting the input member on the second shaft is arranged radially within the friction clutches.

It is possible in this way for the axial design to be shortened yet further, in particular if the vibration damper arrangement is also aligned axially with the friction clutches.

According to a further preferred embodiment, the input member is mounted axially on the second shaft. In this way, it is possible to use the input member as a bearing point for actuator arrangements.

It is particularly advantageous here if a bearing arrangement for radially and axially mounting the input member on the second shaft has a single bearing.

Here, it is possible to realize a low level of component expenditure, and thereby ultimately also a short axial design.

It is also advantageous overall if a bearing arrangement for mounting the input member on the second shaft is arranged in the axial direction behind the output member of the second friction clutch.

In said embodiment, the input member may be of comparatively simple construction.

In the present context, the expressions "at the front and at the rear in the axial direction" are intended to relate respectively to the drive input side and the drive output side of the dual clutch arrangement.

In an alternative embodiment, a bearing arrangement for mounting the input member on the second shaft is arranged in the axial direction between the output members of the friction clutches.

In said embodiment, it is likewise possible to realize a short axial design. Furthermore, the bearing arrangement may if appropriate be simplified since the input member extends in the axial direction likewise between the output members of the friction clutches, and may consequently be mounted axially thereon.

According to a further preferred embodiment, the input member has a radial section which is arranged in the axial direction behind the friction clutches.

In this way, it is possible in a structurally simple manner for the common input member of the friction clutches to be connected to a vibration damper arrangement which is situated radially at the outside.

Here, it is also advantageous if the radial section of the input member has at least one opening through which at least one actuator arrangement can actuate at least one of the friction clutches.

In this way, it is possible for the friction clutches to be assigned at least one actuator arrangement which is arranged in the axial direction behind the input member.

The actuator arrangements may comprise hydraulic or electric actuator arrangements, such as for example electrohydraulic, electromechanical, electromotive and/or electromagnetic actuators.

According to a further preferred embodiment, the input member is connected to a drive input member of the dual clutch arrangement.

Here, the input member may be rigidly connected to a drive input member of the dual clutch arrangement. In this case, the dual clutch arrangement may also be provided without a vibration damper arrangement. It is also conceivable for the output members of the friction clutches to be connected to the associated shafts by means of respective vibration damper arrangements.

It is however particularly preferable for the input member to be connected to the drive input member via the vibration damper arrangement.

In this way, the input member may extend for example in the axial direction behind the friction clutches, and the drive input member may be arranged in the axial direction in front of the friction clutches or in front of the vibration damper arrangement.

It is particularly preferably if the drive input member has a shaft section which extends out of a housing of the dual clutch arrangement.

Here, the shaft section may be connected to the drive input side, for example to a crankshaft or a flywheel of the associated drivetrain.

Here, it is particularly advantageous if the first shaft is mounted radially on the shaft section of the drive input member.

This likewise permits an axially compact design. The second shaft may for example be mounted on the first shaft.

According to a further preferred embodiment, the drive input member has a radial section, with a first axial bearing being arranged between the output member of the first friction clutch and the radial section.

Here, the first axial bearing may serve to absorb axial forces which occur during the actuation of the first friction clutch.

It is also preferable overall if a second axial bearing is arranged between the output member of the first friction clutch and a member of the second friction clutch.

In this way, the second axial bearing can absorb forces which are generated during the actuation of the second friction clutch.

Here, the member of the second friction clutch may be a member, such as an input plate carrier, which is fixedly connected to the input member, or may be an output member.

It is also preferable if the output member of the first friction clutch is arranged radially at the inside.

This likewise permits an axially compact design;

In the present connection, the arrangement of the output member radially at the inside or at the outside is intended to relate in each case to the relative arrangement of the corresponding input member section of the respective friction clutch. For example, in the case of a multiplate clutch, an output member which is situated radially at the inside may be an inner plate carrier.

According to an alternative embodiment, the output member of the first friction clutch is arranged radially at the outside.

It is also preferable overall if the output member of the second friction clutch is arranged radially at the inside.

As an alternative, the output member of the second friction clutch may also be arranged radially at the outside.

It is advantageous overall if the first friction clutch is arranged radially outside the second friction clutch and/or if the friction clutches are embodied as wet-running friction clutches.

The arrangement of the vibration damper arrangement within the housing of the dual clutch arrangement preferably means that the vibration damper arrangement is also of wet-running design.

With at least one of the above-described embodiments, it is possible to realize a dual clutch arrangement which is suitable for installation in front-transverse layout drivetrains for motor vehicles. On account of the use of wet-running friction clutches, it is possible for comparatively high torques to be transmitted.

The arrangement of the vibration damper radially outside or laterally adjacent to the friction clutches allows better protection of the vibration damper if appropriate. Overall, it is possible to realize an integrated design of the friction clutches and of the vibration damper arrangement. It is also possible for the number of components to be reduced, in particular the number of axial bearings and/or axial fastening elements of the friction clutch(es).

It is self-evident that the features specified above and the features yet to be explained below can be used not only in the respectively specified combination but rather also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
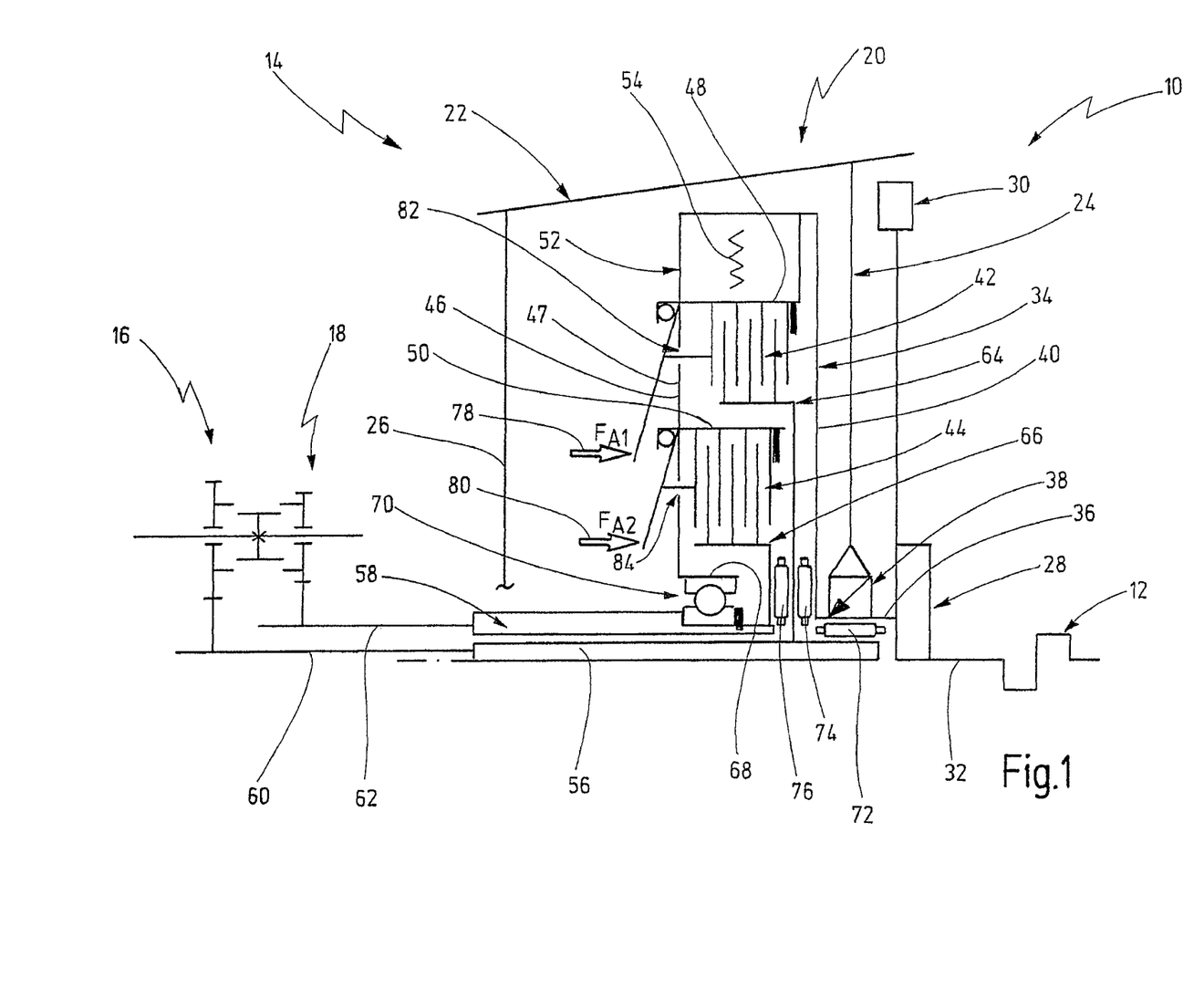
FIG. 1 shows a drivetrain for a motor vehicle, having a first embodiment of a dual clutch arrangement according to the invention.

In FIG. 1, a drivetrain for a motor vehicle is schematically illustrated and denoted generally by 10. The drivetrain 10 is designed as a drivetrain which is of axially short construction, in particular for front-transverse installation.

The drivetrain 10 comprises a drive engine 12, such as an internal combustion engine or a hybrid drive unit, and a dual clutch transmission 14. The dual clutch transmission 14 has, in a way which is known per se, a first partial transmission 16 and a second partial transmission 18. The partial transmissions 16, 18 are illustrated in FIG. 1 merely schematically in the form of a respective gear set. The dual clutch transmission 14 also comprises a dual clutch arrangement 20.

The dual clutch arrangement 20 has a housing 22 with a first housing wall 24 and a second housing wall 26. The first housing wall 24 is a front housing wall adjacent to the drive engine 12. The second housing wall 26 is a rear housing wall adjacent to the partial transmissions 16, 18.

The drive engine 12 is connected to a flywheel 28 which is mounted outside the housing 22 and which comprises, at its outer periphery, a starter toothing 30. The crankshaft of the drive engine 12 is denoted by 32 and is fixedly connected to the flywheel 28.

The dual clutch arrangement 20 has a drive input member 34 which comprises a shaft section 36. The shaft section 36 extends through the first housing wall 22 and is fixedly connected to the flywheel 28. At the outer periphery, the shaft section 36 is sealed off with respect to the housing 22 by means of a shaft seal 38.

The drive input member 34 also has a radial section 40 which extends radially outward proceeding from the shaft section 36 in the interior of the housing 22.

The dual clutch arrangement 20 also comprises a first friction clutch 42 and a second friction clutch 44, which friction clutches 42, 44 are arranged so as to be nested radially one inside the other. The friction clutches 42, 44 may each be embodied as multiplate clutches, in particular as wet-running multiplate clutches. The first friction clutch 42 is arranged radially outside the second friction clutch 44, specifically concentrically with respect to the latter.

The friction clutches 42, 44 have a common input member 46 which has a generally radially extending radial section 47 and which is arranged behind the friction clutches 42, 44. The first friction clutch 42 has a first input plate carrier 48 which is rigidly connected to the input member 46. The second friction clutch 44 has a second input plate carrier 50 which is likewise rigidly connected to the input member 46.

The input member 46 is connected to the drive input member 34 via a vibration damper arrangement 52 which is arranged radially outside the first friction clutch 42 and so as to be axially aligned with the latter. The vibration damper arrangement 52 has, in a manner which is known per se, spring means 54 which are designed to dampen undesired vibrations which are generated for example by the drive engine 12. The vibration damper arrangement 52 may also comprise further functions, in a way which is likewise known per se.

The dual clutch arrangement 20 also comprises a first shaft 56, which is embodied as an inner shaft, and a second shaft 58, which is arranged as a hollow shaft concentrically around the first shaft 56. The first shaft 56 is connected to a first transmission input shaft 60 of the first partial transmission 16. The second shaft 58 is connected to a second transmission input shaft 62 of the second partial transmission 18.

A common output shaft of the partial transmissions 16, 18 may, in a manner which is known per se, be connected to a mechanical differential, in particular to a front axle differential and/or a torque vectoring arrangement or a twin clutch, in order to drive the wheels in the region of the front axle.

The first friction clutch 42 has a first output member in the form of a first output plate carrier 64. The second friction clutch 44 has a second output member in the form of a second output plate carrier 66.

In the dual clutch arrangement of FIG. 1, the input plate carriers 48, 50 are embodied as outer plate carriers, and the output plate carriers 64, 66 are embodied as inner plate carriers. The first output plate carrier 64 is connected by means of a radial section to the first shaft 56. The second output plate carrier 66 is connected by means of a radial section to the second shaft 58.

The input member 46 has an axially extending shaft stub 68. The shaft stub 68 extends forward proceeding from the radial section 47 of the input member 46, specifically in such a way that the shaft stub 68 is arranged substantially radially within the second friction clutch 44.

The dual clutch arrangement 20 is mounted axially on the second shaft 58 by means of the shaft stub 68, specifically via a bearing arrangement 70.

The bearing arrangement 70 is embodied as a combined axial/radial bearing and is designed to both radially mount the dual clutch arrangement 20 and also absorb axial forces which are introduced into the input member 46.

A particularly compact axial design is generated overall, since both the vibration damper arrangement 52 and also the bearing arrangement 70 are aligned in the axial direction with the friction clutches 42, 44.

The shaft section 36 of the drive input member 34 is mounted on the first shaft 56 by means of a radial bearing 72, specifically preferably in the region of the shaft seal 38 as viewed axially. For this purpose, the first shaft 56 extends rearward in the axial direction beyond that section in which the first output plate carrier 64 is connected to the first shaft 56.

A first axial bearing 74 is provided between the drive input member 34 and a radial section of the first output plate carrier 64. A second axial bearing 76 is provided between a radial section of the first output plate carrier 64 and a radial section of the second output plate carrier 66.

The axial bearings 74, 76 serve to absorb forces which are generated as a result of the actuation of the friction clutches 42, 44. Since the drive input member 34 is rigidly connected to the flywheel 28, which is mounted axially in any case, the axial forces can consequently be introduced into an axial bearing of the wheel 28, which is however not illustrated in FIG. 1 for clarity.

To actuate the friction clutches 42, 44, a first actuator arrangement 78 and a second actuator arrangement 80 are provided, which actuator arrangements 78 and 80 can exert the respective forces FA1 and FA2 on the plates of the friction clutches 42, 44 in the axial direction. The actuator arrangements 78, 80 are illustrated merely schematically in FIG. 1, but are arranged, as viewed in the axial direction, behind the two friction clutches 42, 44 and behind the input member 46, preferably within the housing 22. The actuator arrangements 78, 80 may be hydraulic or electric actuator arrangements, in particular electrohydraulic, electromotive or electromagnetic actuator arrangements.

The input member 46 has a first opening 82 through which the first actuator arrangement 78 can actuate the first friction clutch 42. The input member 46 also has a second opening 84 through which the second actuator arrangement 80 can actuate the second friction clutch 44.

It is self-evident that the friction clutches 42, 44 are embodied in particular as wet-running multiplate clutches. The associated fluid supply for lubrication and cooling purposes is not shown in FIG. 1 for clarity of the illustration. The lubricating fluid, which is typically dispensed from radially at the inside, is conducted through by the centrifugal forces through the friction clutches 42, 44 and finally also through the vibration damper arrangement 52. The fluid is discharged rearward on account of an inclined upper side of the housing 22, specifically into a sump which may be formed in two parts in the axial direction in order to avoid splashing losses of the dual clutch arrangement 20.

The actuator arrangements 78, 80 may be embodied as single-acting actuator arrangements, with the friction clutches 42, 44 opening automatically in the non-actuated state as a result of the radially outwardly flowing lubricating or cooling fluid.

The following FIGS. 2 to 6 show alternative embodiments of dual clutch arrangements 20 according to the invention. The dual clutch arrangements described below are generally identical in terms of design and function to the dual clutch arrangement described above with regard to FIG. 1. Identical elements are therefore provided with the same reference numerals. Only the differences are explained below.

Figure 2:
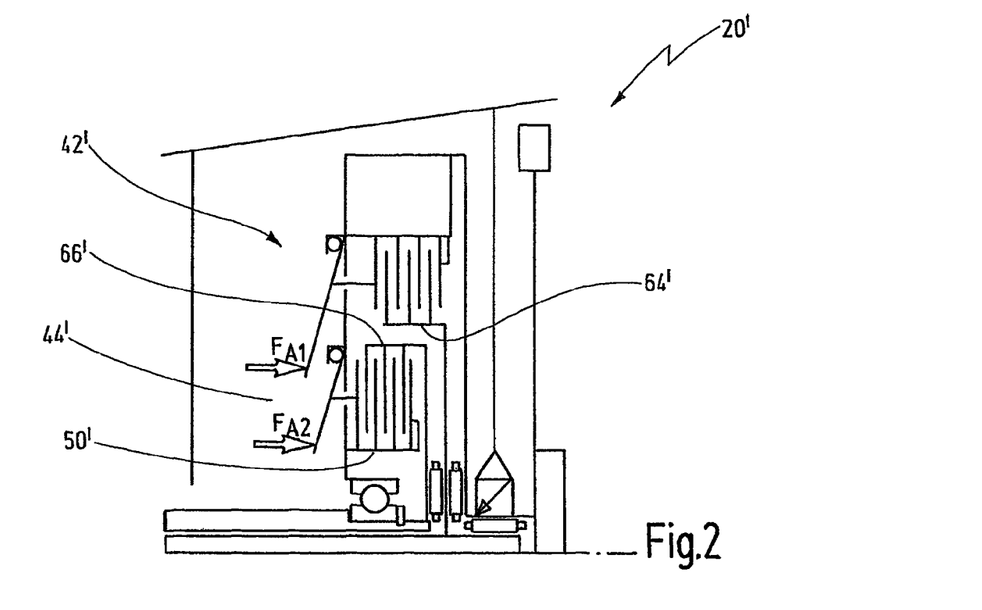
FIG. 2 shows an alternative embodiment of a dual clutch arrangement according to the invention.

FIG. 2 shows a dual clutch arrangement 20' in which the second input plate carrier 50' is embodied as an inner plate carrier, and in which the second output plate carrier 66' is embodied as an outer plate carrier.

Figure 3:
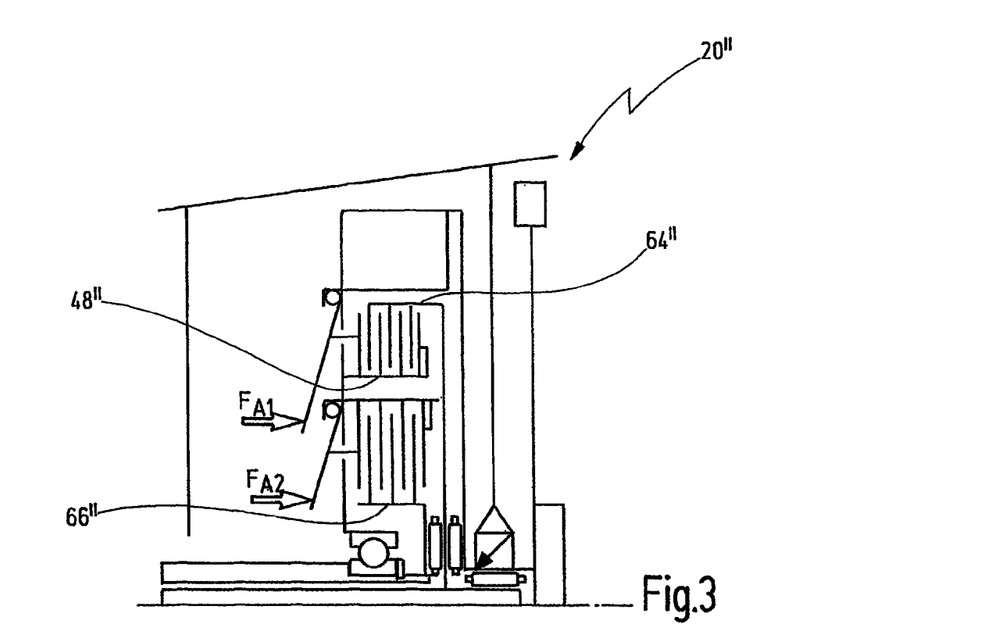
FIG. 3 shows a further alternative embodiment of a dual clutch arrangement according to the invention.

FIG. 3 shows a further embodiment of a dual clutch arrangement 20" according to the invention, which embodiment differs from the embodiment of FIG. 1 in that the first input plate carrier 48" is embodied as an inner plate carrier and the first output plate carrier 64" is embodied as an outer plate carrier.

Figure 4:
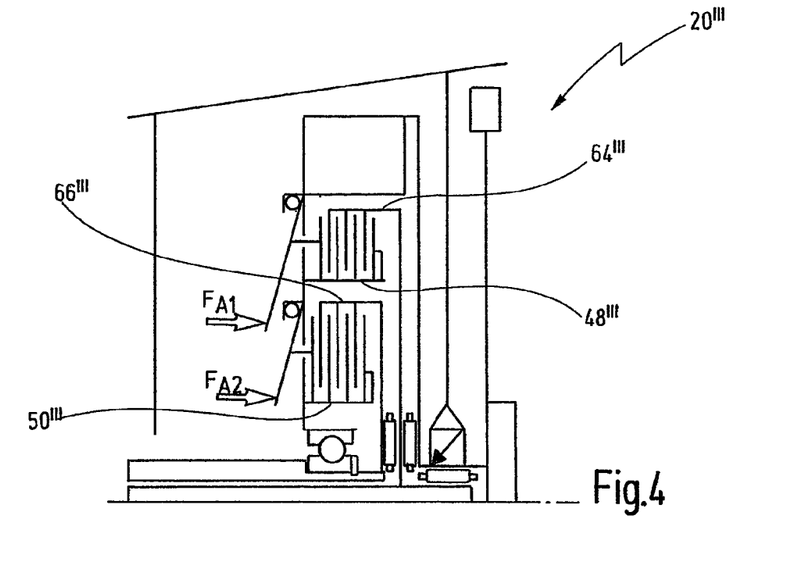
FIG. 4 shows a further alternative embodiment of a dual clutch arrangement according to the invention.

In the dual clutch arrangement 20''' shown in FIG. 4, in contrast to the embodiment of FIG. 1, both input plate carriers 48''', 50''' are embodied as inner plate carriers, and both output plate carriers 64''', 66''' are embodied as outer plate carriers.

Figure 5:
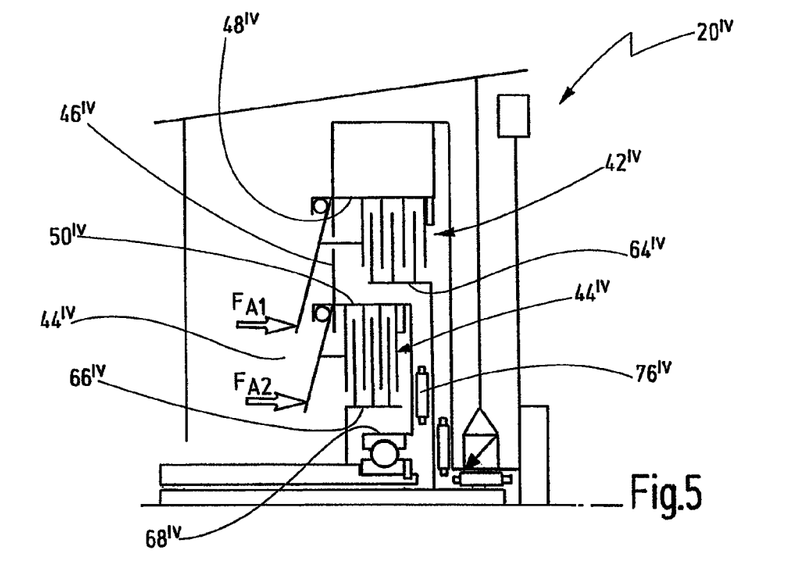
FIG. 5 shows a further alternative embodiment of a dual clutch arrangement according to the invention.

FIG. 5 shows a further dual clutch arrangement 20IV which differs from the embodiment of FIG. 1 in that the input member 46IV has a further radial section which extends axially in front of the second friction clutch 44IV and which is connected to a shaft stub 68IV. Here, the shaft stub 68IV extends rearward in the axial direction from the foremost section of the input member 46IV, specifically below the second friction clutch 44IV. The second axial bearing 76IV is, in this embodiment, arranged between the foremost section of the input member 46IV and the radial section of the first output plate carrier 64IV, and is situated radially slightly further outward than in the embodiment of FIG. 1.

Figure 6:
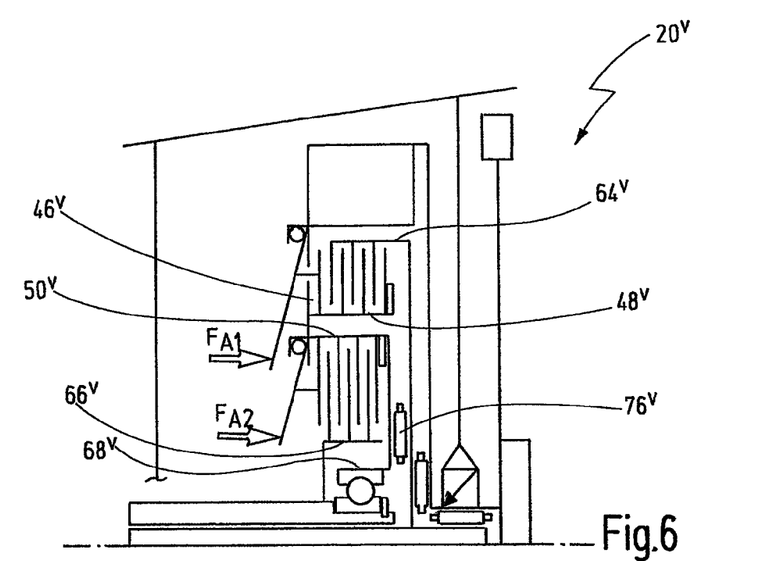
FIG. 6 shows a further alternative embodiment of a dual clutch arrangement according to the invention.

FIG. 6 shows a further dual clutch arrangement 20V which corresponds substantially to the dual clutch arrangement 20IV of FIG. 5.

In contrast to the dual clutch arrangement 20IV, in the dual clutch arrangement 20V, the first input plate carrier 48V is embodied as an inner plate carrier, and the first output plate carrier 64V is embodied as an outer plate carrier.

Figure 7:
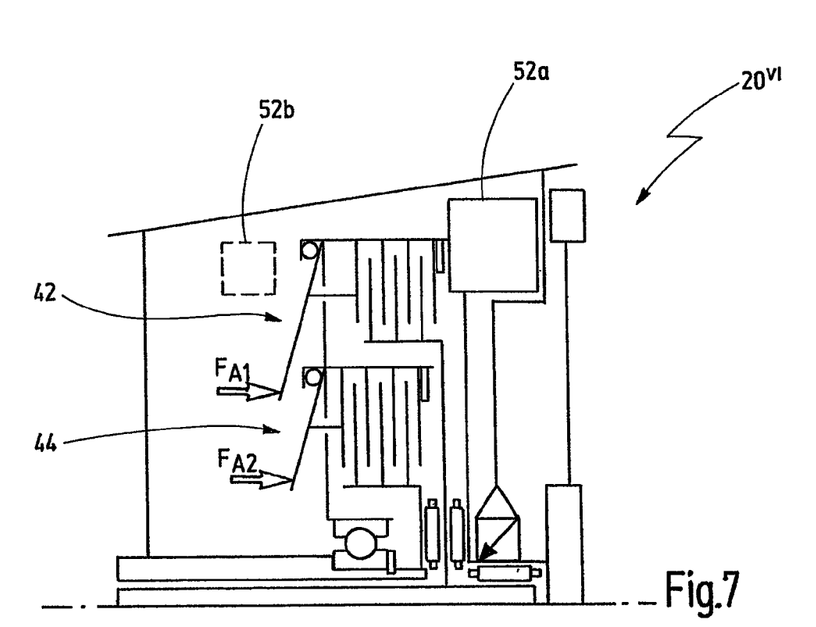
FIG. 7 shows a further alternative embodiment of a dual clutch arrangement according to the invention.
Figure 8:
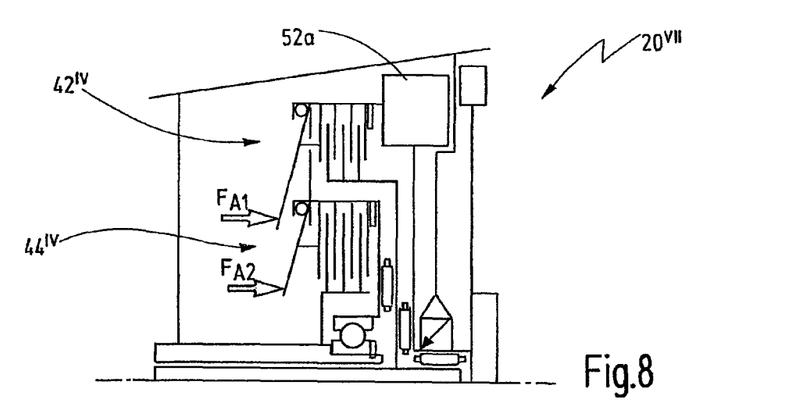
FIG. 8 shows a further alternative embodiment of a dual clutch arrangement according to the invention.

FIGS. 7 and 8 show alternative embodiments of dual clutch arrangements 20VI and 20VII. Here, the general design of the dual clutch arrangement 20VI of FIG. 7 corresponds to the dual clutch arrangement 20 of FIG. 1, which comprises a first friction clutch 42 and a second friction clutch 44. However, in the dual clutch arrangement 20VI, a vibration damper arrangement 52a is provided not so as to be axially aligned with the friction clutches 42, 44, but rather laterally adjacent to the friction clutches 42, 44. Here, the vibration damper arrangement 52a is provided between an input-side housing wall and the friction clutches 42, 44. It is alternatively possible for a lateral vibration damper arrangement of said type to also be provided between an output-side housing wall and the friction clutches 42, 44, that is to say axially behind the friction clutches 42, 44, as is schematically shown in FIG. 7 by 52b.

The lateral arrangement of the vibration damper arrangement 52a or 52b permits a reduction in the radial dimensions of the dual clutch arrangement. Furthermore, the flow through the first friction clutch 42 can be improved if the latter is embodied as a wet-running clutch.

The dual clutch arrangement 20VII corresponds in terms of its basic design to the dual clutch arrangement 20IV of FIG. 5, but with the vibration damper arrangement 52a being arranged laterally adjacent to the friction clutches 42IV, 44IV, similarly to the dual clutch arrangement 20VI. In this embodiment, too, it is possible (although not illustrated) for the vibration damper arrangement to be arranged axially behind the friction clutches 42IV, 44IV.

It is self-evident that a lateral arrangement of a vibration damper arrangement may also be realized in the other above-described embodiments of dual clutch arrangements as per FIGS. 1 to 6.

Figure 9:
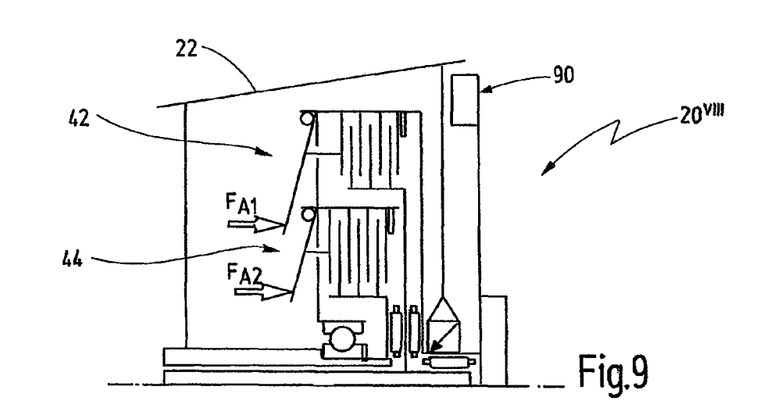
FIG. 9 shows a further alternative embodiment of a dual clutch arrangement according to the invention.
Figure 10:
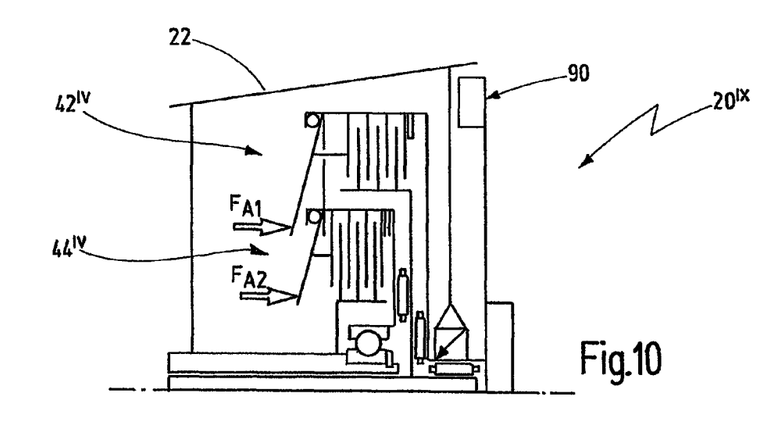
FIG. 10 shows a further alternative embodiment of a dual clutch arrangement according to the invention.

FIGS. 9 and 10 show two further alternative embodiments of dual clutch arrangements 20VIII and 20IX, in which a vibration damper arrangement 90 is provided outside a housing 22 of the respective dual clutch arrangement. The vibration damper arrangement 90 may consequently be embodied as a "dry" vibration damper arrangement, for example as a dual-mass flywheel. Furthermore, the vibration damper arrangement 90 may comprise a starter toothing, as is schematically illustrated radially at the outside in FIGS. 9 and 10.

In the dual clutch arrangements 20VIII, 20IX, no further vibration damper arrangement is provided within the housing 22. The dual clutch arrangement 20VIII otherwise corresponds in terms of the rest of its design to the dual clutch arrangement 20 of FIG. 1, which has a first friction clutch 42 and a second friction clutch 44. In a corresponding manner, the basic design of the dual clutch arrangement 20IX corresponds to that of the dual clutch arrangement 20IV of FIG. 5, which has a first friction clutch 42IV and a second friction clutch 44IV.

It is self-evident that the alternative embodiment with a vibration damper arrangement situated outside the housing 22 may also be combined with the other above-described embodiments of FIGS. 1 to 6 (in each case as an alternative to the vibration damper arrangement 52 which is arranged in the housing 22).

What is claimed is:

1. Dual clutch arrangement for a dual clutch transmission for motor vehicles, having a first and a second friction clutch, said friction clutches have a common input member and in each case one output member, with the output member of the first friction clutch being connected to a first shaft and with the output member of the second friction clutch being connected to a second shaft which is formed as a hollow shaft concentrically around the first shaft, with the first and the second friction clutches being nested radially one inside the other, and wherein the input member is mounted radially on the second shaft, where a bearing arrangement provides an entirety of the bearing support of the input member on the second shaft, wherein the entirety of the bearing arrangement is arranged radially within the friction clutches, and wherein the entirety of the bearing arrangement for mounting the input member on the second shaft is aligned axially with the friction clutches.

2. Dual clutch arrangement according to claim 1, comprising a vibration damper arrangement for damping undesired vibrations, the vibration damper arrangement is arranged radially outside the friction clutches.

3. Dual clutch arrangement according to claim 2, wherein the vibration damper arrangement is aligned axially with the friction clutches.

4. Dual clutch arrangement according to claim 1, comprising a vibration damper arrangement for damping undesired vibrations, the vibration damper arrangement is arranged laterally adjacent to the friction clutches.

5. Dual clutch arrangement according to claim 1, comprising a vibration damper arrangement outside a housing of the dual clutch arrangement.

6. Dual clutch arrangement according to claim 1, wherein the input member is mounted axially on the second shaft.

7. Dual clutch arrangement according to claim 6, wherein the bearing arrangement for radially and axially mounting the input member on the second shaft has a single bearing.

8. Dual clutch arrangement according to claim 1, wherein the bearing arrangement for mounting the input member on the second shaft is arranged in the axial direction behind the output member of the second friction clutch.

9. Dual clutch arrangement according to claim 1, wherein the bearing arrangement for mounting the input member on the second shaft is arranged in the axial direction between the output members of the friction clutches.

10. Dual clutch arrangement according to claim 1, wherein the input member has a radial section which is arranged in the axial direction behind the friction clutches.

11. Dual clutch arrangement according to claim 10, wherein the radial section of the input member has at least one opening through which at least one actuator arrangement can actuate at least one of the friction clutches.

12. Dual clutch arrangement according to claim 1, wherein the friction clutches are assigned at least one actuator arrangement which is arranged in the axial direction behind the input member.

13. Dual clutch arrangement according to claim 1, wherein the input member is connected to a drive input member of the dual clutch arrangement.

14. Dual clutch arrangement according to claim 13, wherein the input member is connected to the drive input member via a vibration damper arrangement.

15. Dual clutch arrangement according to claim 13, wherein the drive input member has a shaft section which extends out of a housing of the dual clutch arrangement.

16. Dual clutch arrangement according to claim 15, wherein the first shaft is mounted radially on the shaft section.

17. Dual clutch arrangement according to claim 13, wherein the drive input member has a radial section, with a first axial bearing being arranged between the output member of the first friction clutch and the radial section.

18. Dual clutch arrangement according to claim 1, wherein a second axial bearing is arranged between the output member of the first friction clutch and a member of the second friction clutch.

19. Dual clutch arrangement according to claim 1, wherein the output member of the first friction clutch is arranged radially at the inside.

20. Dual clutch arrangement according to claim 1, wherein the output member of the first friction clutch is arranged radially at the outside.

21. Dual clutch arrangement according to claim 1, wherein the output member of the second friction clutch is arranged radially at the inside.

22. Dual clutch arrangement according to claim 1, wherein the output member of the second friction clutch is arranged radially at the outside.

23. Dual clutch arrangement according to claim 1, wherein the first friction clutch is arranged radially outside the second friction clutch.

24. Dual clutch arrangement according to claims 1, wherein the friction clutches are embodied as wet-running friction clutches.

* * * * *